May 8, 1962 E. H. GEIBEL 3,033,332
FASTENER CLIP
Filed Aug. 3, 1959
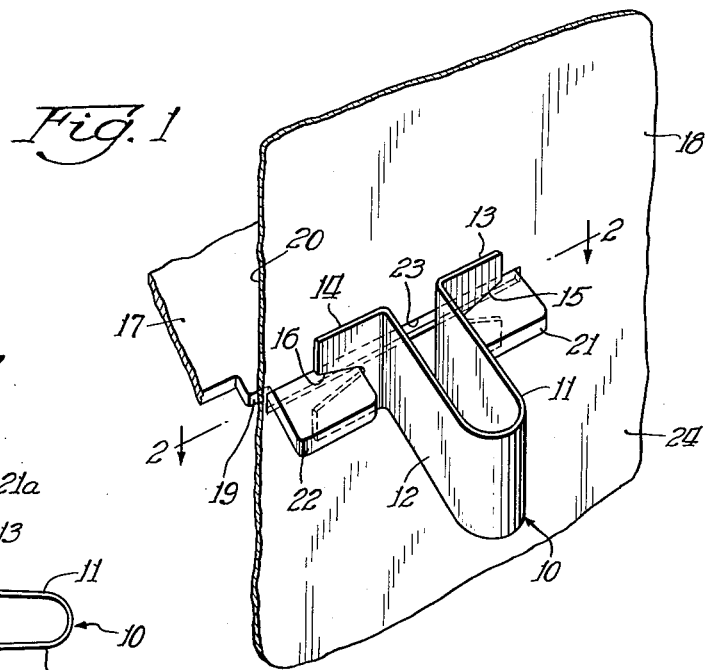
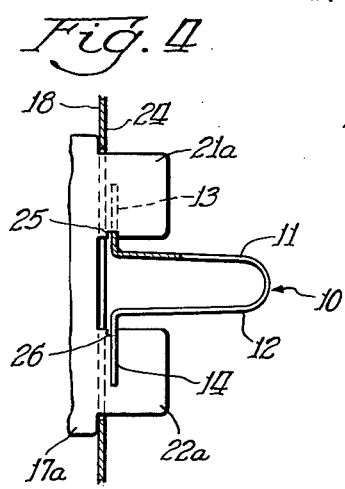
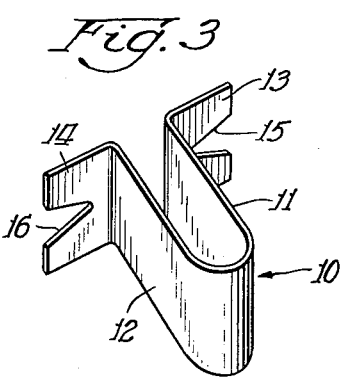
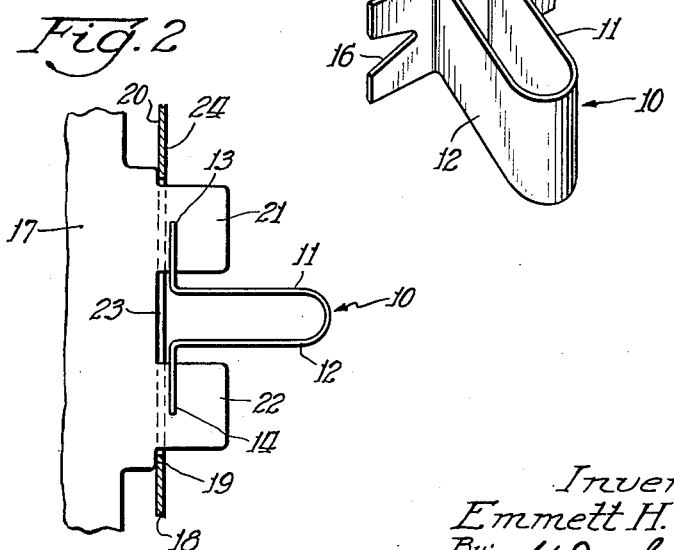
Inventor:
Emmett H. Geibel
By: H. J. Schmid Atty.

United States Patent Office 3,033,332
Patented May 8, 1962

3,033,332
FASTENER CLIP
Emmett H. Geibel, Effingham, Ill., assignor to Borg-Warner Corporation, Chicago, Ill., a corporation of Illinois
Filed Aug. 3, 1959, Ser. No. 831,316
9 Claims. (Cl. 189—35)

This invention relates to improvements in fastening devices in the form of fastener clips for securing cooperating parts in an installation, or for attaching an object or article of manufacture to a structural part such as a panel member or the like.

It is an object of the invention to provide an improved fastener clip of resilient sheet metal, simple and novel in construction, readily and inexpensively fabricated, and particularly adapted for easy and quick application to cooperating parts of an installation.

Another object of the invention is to provide an improved fastener clip for securing cooperating parts of an installation and employing a spring action at a plurality of spaced points to provide a reliable fastening installation.

Another object of the invention is to provide an improved fastener clip especially designed to connect and secure together cabinet structure parts including a panel having an opening for reception of spaced tabs on the edge of a support or supporting member with the clip being of U-shaped configuration and extending between the tabs and having oppositely outwardly extending lateral feet engaging the side of the panel and provided with notches receiving the confronting edges of the tabs to firmly grip said tab edges by spring pressure of the clip. In a modification of the invention, the confronting side edges of the tabs of the support are formed with aligned slots adjacent the panel for reception of the laterally extending feet of the clip.

Other objects of the invention having the various advantages and characteristics of the present fastener clip will be apparent from a consideration of the following detailed description.

In the drawing, which accompanies and forms a part of this specification or disclosure and in which like numerals of reference designate corresponding parts throughout the several views:

FIG. 1 is a perspective view showing a fastener clip embodying the invention in use with an installation having a supported part provided with a tab extending through and assembled with a cooperating supporting part and showing a fastener clip applied thereto to secure such parts in assembly;

FIG. 2 is a horizontal transverse sectional view of FIG. 1 showing the clip in applied fastening position securing the parts of the installation shown in FIG. 1;

FIG. 3 is a perspective view of the clip; and

FIG. 4 is a view illustrating a modification of the invention.

The spring fastener clip 10 is preferably formed of a resilient piece of metal of suitable temper and gage and preferably, but not necessarily, of uniform thickness and as a one-piece sheet metal stamping suitably formed to the configuration shown in the drawings. More particularly, the fastener clip comprises a strip of spring steel or cold rolled steel formed to assume a U-shape providing parallel spring legs 11, 12 having laterally outwardly extending coplanar flat end portions or feet 13, 14 disposed at substantially right angles to the legs 11 and 12. As seen in FIGS. 1 and 3, the end portions 13, 14 of the legs 11, 12 have cutout areas to define V-shaped notches 15, 16 therein with the apices of the notches being spaced from the parallel legs 11, 12 and with the notches diverging outwardly toward the edges of the end portions of the legs. This is an important feature which will be more fully discussed later.

Although it will be obvious that the fastener clip will have numerous applications and can be advantageously used in securely connecting numerous types of cooperating parts of installations it is particularly adapted to secure the edge of one member to the side of another member. One example of the application of the fastener clip is shown in the drawing in which the clip is instrumental in connecting an edge of a horizotal panel 17 to the side of a vertical panel 18, the panels being formed of metal or plastic, the panel 17 being disposed perpendicular to the panel 18. The panel 17 has its edge 19 seated against and engaging the side 20 of the panel, and the edge 19 is provided with a pair of spaced tabs 21, 22 in coplanar relation and extending through and outwardly of an elongate slot 23 in the panel 18 to support the panel 17 on the panel 18.

Referring to the assembly of the panels 17 and 18 and the fastener clip in FIGS. 1 and 2, the tabs 21 and 22 on the edge 19 of the panel 17 have been inserted in the slot 23 in the panel 18, and the panel 17 moved toward the panel 18 to position the edge 19 of the panel 17 in engagement with the side 20 of the panel 18 with the tabs on the panel 17 extending outwardly of the other and opposite side 24 of the panel 18. To secure the panels, the fastener clip is grasped to move the legs 11, 12 toward each other against the pressure of the spring force of the clip and the clip is moved to position the adjacent confronting side edges of the tabs within the V-shaped notches 15, 16 in the end portions 13, 14 of the legs 11, 12 and which serve as guides for further movement of the clip until the end portions engage the side 24 of the panel 18. At this time, the clip is released to permit the stored energy of the spring force provided by the bowed portion thereof to move the legs to wedgingly engage portions of the tabs at the apices of the notches, with the adjacent edges of the tabs to securely connect the panels together. It will be apparent that any force applied to the panels to separate the panels will be resisted by the wedging engagement of the fastener clip with the tabs 21, 22 of the panel 17. However, the panels may be readily disassembled by movement of the legs of the fastener toward each other to disconnect the feet of the clip from the tabs of the panel 17 and movement of the fastener outwardly to remove the clip. As the weight of the panel 17 is supported by its tabs on the panel 18, the fastener need only exert sufficient spring force on the tabs to prevent relative movement of the panels to maintain the panels in assembly.

FIG. 4 illustrates a modification of the invention in which the panel 17a has its tabs 21a and 22a provided with slots or notches 25 and 26 in the adjacent confronting side edges thereof adapted to be located at the juncture of the tabs with the edge of the panel 17a and at a distance from the panel edge approximately the thickness of the panel 18 so that the slots or notches are disposed closely adjacent to the side 24 of the panel 18. Positioned within the slots 25 and 26 are parts of the end portions or feet 13 and 14 of the legs 11 and 12 of the clip at the apices of the V-shaped notches in the end portions. In this arrangement, the spring force of the clip is continuously operative to maintain the described end portions of the legs in the slots in the tabs to provide a mechanical connection positively preventing separation of the panels but permitting readily disassembly by grasping the fastener to move its legs toward each other to release the connection between the fastener and the tabs.

While the invention has been described in detail with specific examples, such examples are intended as illustrations only, since it will be apparent to those skilled in the

What is claimed is:

1. In combination with a slotted first member, a second member having an edge abutting said first member and provided with spaced tabs disposed in a single plane and extending through the slot in the first member, a spring clip fastening device comprising a strip of spring metal successively bent so as to provide a contracted U-shaped body portion, the two legs of said body portion extending parallel to the plane of the spaced tabs between the spaced tabs of the second member and terminating in outwardly extending feet substantially perpendicular to the respective planes of said tabs and said legs, said feet being thereby adapted to engage the first member in parallel engagement with the surface of said first member when the spring clip is applied, the feet having notches therein for receiving the inner confronting edges of the spaced tabs of the second member, with portions of the feet, defining the bottoms of the notches therein, being urged into engagement with the inner confronting edges of the tabs by the expanding spring force of the body portion.

2. In combination with a slotted first member, a second member having spaced tabs disposed in a single plane and extending through the slot in the first member, a spring clip fastening device comprising a strip of spring metal successively bent so as to provide a contracted U-shaped body portion, the two legs of said body portion extending parallel to the plane of the spaced tabs between the spaced tabs of the second member and terminating in outwardly extending feet substantially perpendicular to the respective planes of said tabs and said legs, said feet being thereby adapted to engage the first member in parallel engagement with the surface of said first member when the spring clip is applied, the feet having V-shaped notches therein for receiving the inner confronting edges of the spaced tabs of the second member, with portions of the feet, defining the apices of the notches therein, being urged into wedging engagement with the inner confronting edges of the tabs by the expanding spring force of the body portion.

3. In combination with a slotted first member, a second member having an edge abutting said first member and provided with spaced tabs disposed in a single plane and extending through the slot in the first member and having slots in the confronting edges thereof adjacent the first member, a spring clip fastening device comprising a strip of spring metal successively bent so as to provide a contracted U-shaped body portion, the two legs of said body portion extending parallel to the plane of the spaced tabs between the spaced tabs of the second member and terminating in outwardly extending feet substantially perpendicular to the respective planes of said tabs and said legs, said feet being thereby adapted to engage the first member in parallel engagement with the surface of said first member when the spring clip is applied, the feet having notches therein for receiving the inner confronting edges of the spaced tabs of the second member with portions of the feet, defining the bottoms of the notches therein, being received within the inner slots in the confronting edges of the spaced tabs and urged into engagement with the tabs by the expanding spring force of the body portion.

4. In combination with a slotted first member, a second member having an edge abutting said first member and provided with spaced tabs disposed in a single plane and extending through the slot in the first member, a spring clip fastening device comprising a strip of spring metal successively bent so as to provide a contracted U-shaped body portion, the two legs of said body portion extending parallel to the plane of the spaced tabs between the spaced tabs of the second member and terminating in outwardly extending feet substantially perpendicular to the respective planes of said tabs and said legs, said feet being thereby adapted to engage the first member in parallel engagement with the surface of said first member when the spring clip is applied, the feet having notches therein for receiving the inner spaced tabs of the second member with portions of the feet defining the bottoms of the notches therein, being urged into engagement with the tabs by the spring force of the expanding body portion.

5. In combination with a slotted first member, a second member having an edge abutting said first member and provided with spaced tabs disposed in a single plane and extending through the slot in the first member, a spring clip fastening device comprising a strip of spring metal successively bent so as to provide a contracted U-shaped body portion, the two legs of said body portion extending parallel to the plane of the spaced tabs between the spaced tabs of the second member and terminating in outwardly extending feet substantially perpendicular to the respective planes of said tabs and said legs, said feet being thereby adapted to engage the first member in parallel engagement with the surface of said first member when the spring clip is applied, the feet having V-shaped notches therein for receiving the inner spaced tabs of the second member with portions of the feet, defining the apices of the notches therein, being urged into wedging engagement with the inner confronting edges of the tabs by the expanding spring force of the body portion.

6. In combination with a slotted first member, a second member having an edge abutting said first member and provided with spaced tabs extending through the slot in the first member and having slots in the confronting edges thereof adjacent the first member, a spring clip fastening device comprising a strip of spring metal successively bent so as to provide a contracted U-shaped body portion, the two legs of said body portion extending parallel to the plane of the spaced tabs between the spaced tabs of the second member and terminating in outwardly extending feet substantially perpendicular to the respective planes of said tabs and said legs, said feet being thereby adapted to engage the first member in parallel engagement with the surface of said first member when the spring clip is applied, portions of the feet being received within the slots in the inner confronting edges of the spaced tabs and urged into engagement with the tabs by the spring force of the expanding body portion.

7. In combination with a slotted first member, a second member having an edge abutting said first member and provided with spaced tabs disposed in a single plane and extending through the slot in the first member, a spring clip fastening device comprising a contracted body portion formed by a reversely bent strip of spring metal, the two legs of said body portion extending parallel to the plane of the spaced tabs between the spaced tabs of the second member and terminating in outwardly extending feet substantially perpendicular to the respective planes of said tabs and said legs, said feet being thereby adapted to engage the first member in parallel engagement with the surface of said first member when the spring clip is applied, the feet having notches therein for receiving the spaced tabs of the second member with portions of the feet, defining the bottoms of the notches therein being urged into engagement with inner confronting edges of the tabs by the spring force of the body portion.

8. In combination with a slotted first member, a second member having an edge abutting said first member and provided with spaced tabs disposed in a single plane and extending through the slot in the first member and having slots in the confronting edges thereof adjacent the first member, a spring clip fastening device comprising a body portion formed by a contracted reversely bent strip of spring metal, the two legs of said body portion extending parallel to the plane of the spaced tabs between the spaced tabs of the second member and terminating in outwardly extending feet substantially perpendicular to the respective planes of said tabs and said legs, said feet being thereby adapted to engage the first member in parallel engagement with the surface of said first member when the spring clip is applied, the feet having notches therein receiving the inner confronting edges of the spaced tabs of the second member with portions of the feet, defining the bottoms of the notches therein, being received within the slots in the inner confronting edges of the spaced tabs and the tabs by the expanding spring force of the body portion.

9. In combination with a slotted first member, a second member having spaced tabs disposed in a single plane and extending through the slot in the first member a contracted spring clip fastening device comprising a body portion formed by a reversely bent strip of spring metal, the two legs of said body portion extending parallel to the plane of the spaced tabs between the spaced tabs of the second member and terminating in outwardly extending feet substantially perpendicular to the respective planes of said tabs and said legs, said feet being thereby adapted to engage the first member in parallel engagement with the surface of said first member when the spring clip is applied, the feet having V-shaped notches therein receiving the inner confronting edges of the spaced tabs of the second member with portions of the feet, defining the apices of the notches therein, being urged into wedging engagement with the inner confronting edges of the tabs by the expanding spring force of the body portion.

References Cited in the file of this patent

UNITED STATES PATENTS

| | | |
|---|---|---|
| 1,232,527 | Gemmill | July 10, 1917 |
| 1,232,528 | Gemmill | July 10, 1917 |
| 1,537,970 | Stebbins | May 19, 1925 |
| 2,037,301 | Ball | Apr. 14, 1936 |
| 2,781,110 | Weller et al. | Feb. 12, 1957 |